United States Patent

[11] 3,542,468

| [72] | Inventor | James H. Blow, Jr. |
| --- | --- | --- |
| | | Rochester, New York |
| [21] | Appl. No. | 539,400 |
| [22] | Filed | April 1, 1966 |
| [45] | Patented | Nov. 24, 1970 |
| [73] | Assignee | Xerox Corporation |
| | | Rochester, New York |
| | | a corporation of New York |

[54] MICROFILM ENLARGER-COPIER
9 Claims, 3 Drawing Figs.

[52] U.S. Cl.................................................... 355/18,
355/44
[51] Int. Cl................................................. G03b 27/32
[50] Field of Search........................................... 95/1.7;
88/24; 352/47

[56] References Cited
UNITED STATES PATENTS

| 1,819,883 | 8/1931 | Fleischer.................... | 352/47 |
| 2,174,931 | 10/1939 | Terry......................... | 352/47X |
| 2,780,136 | 2/1957 | Erban......................... | 88/245.5 |
| 3,125,927 | 3/1964 | Erban......................... | 88/245.5X |

*Primary Examiner*—John M. Horan
*Attorney*—Norman E. Schrader

ABSTRACT: A microreproduction system including a xerographic copier system for ordinary one-to-one reproduction and a second optical system capable of introducing a microfilm size input for reproduction with the copier system. The second optical system includes a fresnel lens positioned in the focal plane of the copier optical system so as to be scanned, and oscillatory movement is imparted to the fresnel lens in a direction skewed to the direction on scan.

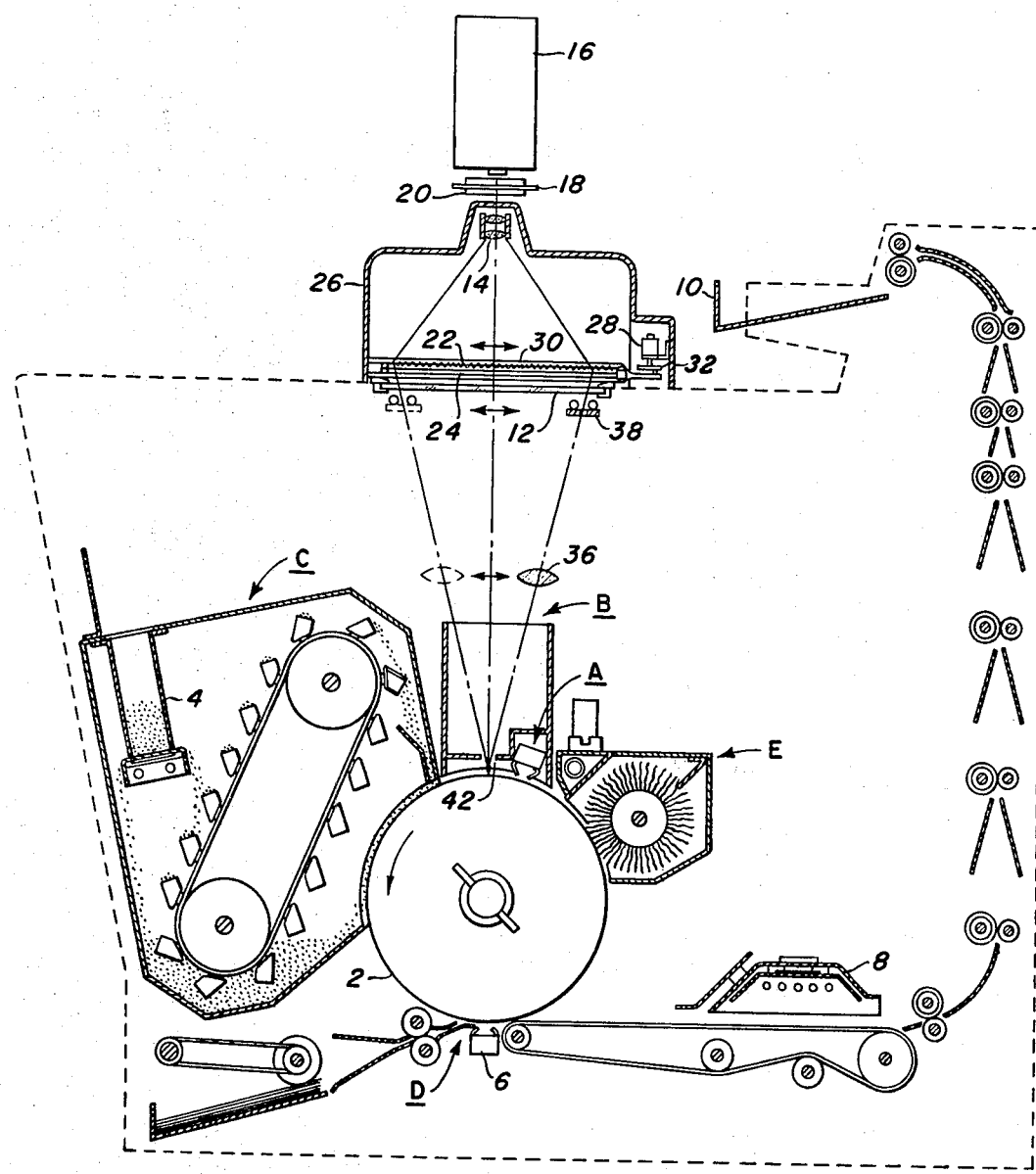
FIG. I
INVENTOR.
JAMES H. BLOW, JR.

INVENTOR.
JAMES H. BLOW, JR.

ATTORNEYS

MICROFILM ENLARGER-COPIER

This invention relates in general to microfilm enlarging and copying and in particular to improved apparatus for reproducing from microfilm originals. More specifically, the invention relates to an improved apparatus for causing microfilm, whether in the form of a single frame mounted in a data processing card or in the form of roll film, to be reproduced on conventional "office copier" machines through an oscillating fresnel lens.

Electrostatography encompasses the entire field of forming and utilizing latent electrostatic charge patterns to record and reproduce patterns in viewable form. Xerography employs a photoconductive insulating medium and radiation to form the latent electrostatic images. For the purpose of this disclosure, an "office copier" refers only to that type of copying apparatus having a platen capable of holding a document or accommodating three dimensional objects and using any process to make copies from original documents.

Since the disclosure of the basic concept of xerography in Carlson U.S. Pat. No. 2,297,691, issued Oct. 6, 1942, a variety of machines and devices have been proposed to incorporate such teachings in a manner to form copy xerographically on a commercial basis. For the most part, each of such devices has been specifically designed to the solution of a particular reproduction problem, and for the most part, has been limited to the particular use intended. Thus, for example, machines are presently in wide commercial use for the continuous high-speed enlargement and copying of microfilm in roll form, and for reproducing from opaque originals.

One of the most commercially successful xerographic machines is that disclosed in Mayo U.S. Pat. No. 3,062,109, issued on Nov. 6, 1962. This machine is used for reproducing from opaque originals which are placed on a platen on the top of its desklike shape. As useful as this machine is, as evidenced by its commercial acceptance, it cannot be used to reproduce xerographic copies from microfilm even though many establishments using this machine have occasion to reproduce copies from their microfilm files. The major problem in the development of an attachment for this type machine, which will enable copying from microfilm originals, is the production of a suitable image in the object plane of the electrostatic reproducing machine with an adequate quantity of usable uniform illumination to enable the existing system to produce an acceptable copy.

The present invention is for use in an attachment to an "office copier" machine originally designed to produce copies from opaque originals. If the machine contains a platen capable of accommodating three dimensional objects, it can be equipped with an attachment incorporating this invention whereby the "office copier" will be able to produce enlarged copies from microfilm originals. This invention would allow portability of a microfilm input attachment while allowing the "office copier" machine to produce enlarged copies of high contrast and resolution of the microsize image found on the microfilm original.

Attempts to devise an apparatus such as the present invention have failed, especially with positive microfilm, because of the flare effect. This means that the abundance of illumination passing through the large transparent sections of the microfilm interfere with the image areas at the plane where the image is made viewable. This makes a poor object for any subsequent projection system, e.g., an "office copier." In other words, the background illumination flares out over the data and destroys the image in the center and edges of the enlarged microdata image.

As for the microfilm input itself, it may be in roll form or single frame mounted in data processing cards. The image thereon may be positive or negative with opaque data and transparent background or with transparent data and opaque background.

Of course, there are machines for producing enlarged copies from microfilm input; however, these machines are not portable nor capable of attachment to other existing "office copiers." Although many of these machines make excellent copies and have been commercially successful, they all image on their photosensitive surface by a direct scan of the microfilm image, that is they cause microfilm to traverse the optical axis of the lens system of the machine in a carefully timed relation to the movement of the photosensitive surface used to form the image or enlarged copy. This necessitates complicated equipment, automatic devices, programing means and elaborate timing equipment for synchronizing the relative movement of the microfilm original scanning device and the xerographic drum upon which the electrostatic image is to be formed. Such a device may be seen, for example, in Hunt U.S. Pat. No. 3,078,770, issued Feb. 6, 1963, and Rutkus U.S. Pat. No. 3,137,202 issued June 16, 1964. This invention eliminates movement of the film relative to a fixed optical axis.

It is therefore an object of this invention to improve reproduction apparatus for microsize image enlarging and copying.

Another object of this invention is to improve portable apparatus for use with existing reproduction machines for reproducing microfilm onto sheets of support material with commercially satisfactory resolution and contrast.

A further object is to provide for reproduction of commercially acceptable copy of a full frame of microfilm with no movement of the film relative to a fixed optical axis.

Another object of this invention is to employ inexpensive and easily fabricated optical equipment to electrostatically enlarge and reproduce with high, commercially satisfactory resolution and contrast from microfilm originals.

Another object is to reproduce enlarged microsize image through a Fresnel lens without reproducing the gratings therein.

These and other objects of the invention are attained by means of an apparatus for projecting microsize image rays for visual viewing through an oscillating Fresnel lens to a light-receiving means of an electrostatic reproducing apparatus in order to make copies of the original projected to the platen of such a copying machine.

For a better understanding of the invention, as well as other objects and further features thereof, reference is had to the following detailed description of the invention to be read in conjunction with the accompanying drawings, wherein:

FIG. 1 illustrates schematically and embodiment of a microfilm attachment employing this invention for projecting viewable images on the platen of an electrostatic copying machine in conjunction with an embodiment of the xerographic apparatus adapted for continuous and automatic operation and incorporating an optical scanning mechanism;

Referring now to the drawings wherein like numerals designate like elements, there is shown schematically in FIG. 1 a microfilm electrostatographic enlarging and copying apparatus in the environment of a xerographic apparatus incorporated as an automatic machine.

Figure 3:
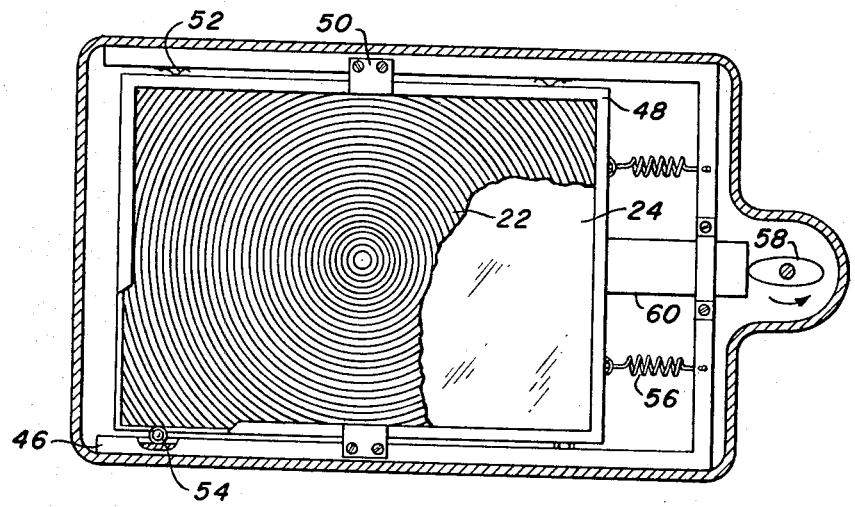
FIG. 3 is a schematic top view of a microsize image member positioned in a cradle for linear oscillation.

The xerographic apparatus comprises a xerographic plate including a photoconductive layer on a conductive backing and formed in the shape of a drum, generally designated by the numeral 2. The drum is mounted on a shaft journaled on a suitable frame of the machine to rotate in the direction indicated by the arrow causing the drum surface sequentially to pass a plurality of xerographic processing stations.

For the purpose of the present disclosure, the several xerographic processing stations in the path of movement of the drum surface may be described functionally, as follows:

A charging station, preferably located as indicated by reference character A, at which a uniform electrostatic charge is deposited on the photoconductive layer of the xerographic drum.

Next subsequent thereto in the path of motion of the xerographic drum is exposure station B at which a light or radiation pattern of copy to be reproduced is projected onto the drum surface to dissipate the drum charge in the exposed areas thereof. Thereby, a latent electrostatic image of copy to be reproduced is formed.

Adjacent to the exposure station is a developing station C whereat the latent electrostatic image is developed by cascading a xerographic powder or toner over the drum. As toner powder images are formed, a toner dispenser 4 replenishes toner to the developing material.

Positioned next adjacent to the developing station is the image transfer station D at which the xerographic powder image is electrostatically transferred from the drum surface to a transfer material or support surface. This is accomplished here by the corona transfer device 6. The powder image may be fused to the transfer material by the fuser 8 and then transported to the copy holder 10.

The final station E is a drum cleaning and discharge station at which the drum surface is brushed to remove residual toner particles remaining after image transfer, and at which the drum surface is exposed to a relatively bright light source to effect substantially complete discharge of any residual electrostatic charge remaining thereon.

For a more complete and detailed description of the automatic xerographic apparatus, see Mayo et al. U.S. Pat. No. 3,062,109 issued Nov. 6, 1962.

At the exposure station B, and more specifically relating to the improvement in microfilm imaging for electrostatographic reproduction, is the microfilm enlarging and imaging apparatus necessary to form a reproducible image on the drum 2 from an object at platen 12. This is accomplished by means of a projection system adapted to converge the light rays diverging from an enlarging, objective lens 14 to form an enlarged and uniformly illuminated object at its focal plane with the rays of light converging therefrom. The object for this system is developed from a projector light source 16, a frame of microfilm 18 held in a film gate 20 situated such that the image light rays pass through objective lens 14 to be enlarged thereby. The resulting image light rays are projected upon a microdata image receiving member composed of a Fresnel lens 22 and a light dispersing or translucent material 24, which can be, for example, frosted glass, etc., placed approximately at the focal plane of the objective lens system and on the platen 12 of the "office copier" machine.

The Fresnel lens has the general characteristics of being composites of small, recurring light deflecting elements that will as an entire unit, perform to achieve a distribution of light over a predetermined area. The gratings or grooves of the lens may be about 50 or more per inch and function within the system. Neither the material of which the lens is composed nor the method of manufacture is important for the invention herein.

The light dispersing material and Fresnel lens may be interchanged in their position on the platen such that either may be above the other. Immediately above the platen is the object plane of the "office copier" reproduction system and the image plane of the microfilm projection system. The image thereon is protected from extraneous light by a container 26 adapted to position the microfilm projection system such that the image falls substantially over platen 12.

The container 26 further serves as the housing for the portable microfilm enlarging and imaging apparatus and oscillating motor 28. It is adapted to movably contain the Fresnel lens and the translucent material on rail 30 while further housing the entire projection system for enlarging and imaging the microfilm. Thus, the entire microfilm projection apparatus is portable and may be easily attached to or detached from an existing "office copier" machine without necessitating modifications in such machine for accepting this apparatus.

The system, therefore, directs an enlarged image of microsize data obtained from the microfilm original to a translucent material on the platen of the "office copier" through a Fresnel lens, to insure the converging of the light rays at the exposure station thereof. The "office copier" may then scan the enlarged microsize image made viewable on the translucent material on its platen to produce a corresponding latent image on its photosensitive surface.

The problem with the system thus far described is that the "office copier" apparatus will copy not only the microdata at its object plane but also the gratings of the Fresnel lens since such gratings appear as lines at the object plane of the apparatus. Elimination of these lines may be accomplished by removing the Fresnel lens from the object focal plane of the copier system, i.e., moving it out of focus to the reproduction system by raising it out of the focal plane. However, this degrades the resolution of the image formed on the photosensitive surface since the object is out of focus to the reproduction system. Through there is sufficient imaging on the photosensitive surface to permit reproduction, the resolution is inadequate for commercial reproduction requirements.

It is, therefore, preferable to retain the Fresnel lens approximately in the focal plane of both the microsize image projection system and the "office copier" reproduction system while eliminating the lines reproduced from the gratings of the Fresnel lens. This is accomplished here by oscillating the Fresnel lens approximately within this plane such that those portions of the photosensitive surface, where the gratings or lines of the Fresnel lens were projected, may receive light rays or be exposed. The rate of the oscillations is related to the "film speed" or photosensitivity of the image carrying surface of the copier apparatus. The exposure of the photosensitive surface on the areas which would remain unexposed because of the grooves of the Fresnel lens is determined by the relation between the rate of oscillation and the speed of the scanning slit.

As long as the oscillations of the Fresnel lens allow light normally blocked by a Fresnel lens groove to permeate the microsize image receiving member, that portion of the photosensitive surface previously blocked from, but now struck by, light rays will be exposed, thus eliminating the image of the groove line on such surface. In a moving photosensitive surface system employing a scanning slit to image the original data thereon (such as FIG. 1) the oscillation rate of the lens must be rapid enough to provide sufficient light to expose the photosensitive surface while the scanning slit is permitting light to that portion of surface previously unexposed because of the Fresnel lens groove. As long as the relative speed of the two is sufficient to expose the photosensitive surface to light for a period required to eliminate the Fresnel line, the system will copy the object shown on the microsize image receiving member without any interference due to the Fresnel lens therein. The oscillating is accomplished by any means such as, for example, motor 28 in conjunction with cam 32 and linkage 34 (see FIG. 2). The higher the "film speed" the lower need be the frequency of oscillation for any particular amplitude of oscillation and number of Fresnel grooves per inch. For example, for a selenium xerographic drum with a speed in the range of ASA 1—3 such as that which would be used in the system shown in FIG. 1, the rate of oscillation need be approximately 23.3 cycles per second if the amplitude of a linear oscillation is one-eighth inch at its extremes with a Fresnel lens of 120 grooves per inch. For the same system with an amplitude of one-half inch for an oscillation cycle, only 7 cycles per second are required to eliminate the grating lines in the xerographically reproduced copy with a Fresnel lens of 120 gratings per inch. For better results, the oscillations of the light receiving member should be transverse to the movement of the scanning slit 38 or scanning lamps of the xerographic machine.

As for the actual reproduction of the enlarged microdata image appearing at the object plane of the "office copier" machine, the image thereon is scanned by a lens 36 through a scanning slit 38 having an aperture therein extending across all the data on the platen. This scanning slit may contain a fluorescent lamp to further illuminate the image on the platen although this is not necessary here but convenient to the existing environment of the "office copier" machine. The function of the slit is to eliminate extraneous light to the scanning lens 36; however, if the scanning lamps of the machine are not used for illuminating the image on the platen, the light shield is not an essential element for obtaining acceptable copies. For a more detailed and complete description of a preferred embodiment of a xerographic scanning apparatus, see Rutkus et al. U.S. Pat. No. 3,062,095 issued Nov. 6, 1962.

Figure 2:
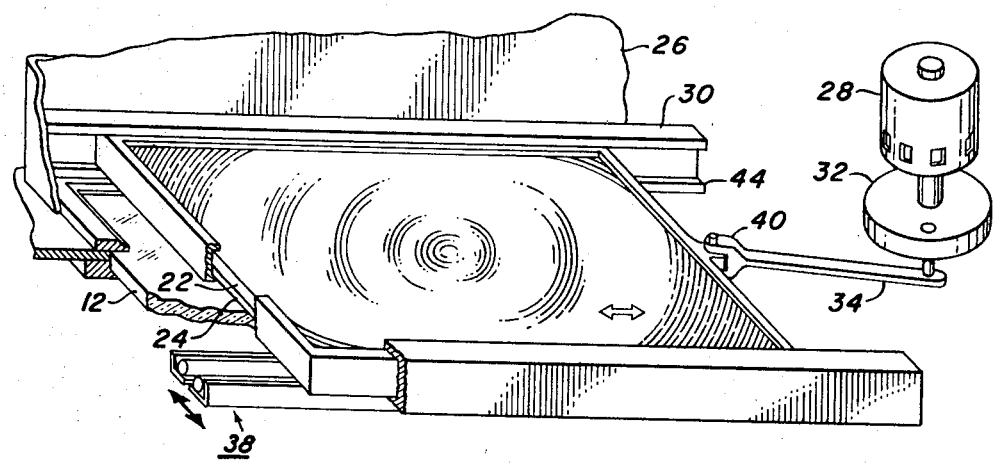
FIG. 2 is a schematic perspective view of the microdata image receiving member with parts broken away.

Referring to FIG. 2 showing the apparatus located at the platen 12 of FIG. 1, there appears a Fresnel lens 22 and translucent material 24 slidably positioned within rails 30 so that they may be linearly oscillated by motor 28 through linkage 34 connected to cam device 32. The linkage may be attached to the Fresnel lens, or the Fresnel lens and translucent material, by any suitable fastening means 40. The guide rails, 30, whether used to allow oscillation of the Fresnel lens alone, or both the Fresnel lens and translucent material, are formed with a narrow lower rail guide and holder 44 so that the Fresnel lens may be positioned as nearly as practicable on the platen 12. The movement of the members within this cradle is indicated by the arrow. It is preferable to oscillate both the Fresnel lens and the light dispersing member since the latter too may cause interference with the microsize image to be reproduced. This is because of the general coarseness of commercial translucent materials. The oscillation of the translucent material allows light rays to pass through its areas of greater shadow or coarse areas.

In FIG. 3, the light imaging member is slidably located within a cradle 46 placed at a platen of an "office copier" reproducing machine. The microdata image receiving member is held in a frame 48 which may also contain a translucent material under or above said frame. The frame is held in guides 50 and is biased by leaf springs 52 maintaining mechanical contact between the frame holding the image receiving member and ball bearings 54, while preventing the frame from escaping from guides 50. Springs 56 hold a bias against cam 58 which is rotated by a motor (not shown), thereby causing the image receiving member mounted within frame 48 to be oscillated in a linear direction the amplitude of which is controlled by follower 60 riding on cam 58 and the frequency of which is controlled by the motor.

As shown in FIG. 1, the image rays leaving the projection system at objective lens 14 diverge, causing an enlargement of the projected image of microfilm. However, the light rays leaving the microsize image receiving member at the object plane of the "office copier" are converging rays such that the light rays are substantially directed to the "office copier" scanning lens 36 through exposure plate aperture 42. This converging of light rays is caused by the Fresnel lens without which the light rays forming the image on the translucent material at the object plane of the "office copier" would continue through, somewhat scattered, but in the diverging manner that they leave the objective lens 14. Much of these light rays would be unusable to the "office copier" system viewing the image formed at its objective plane since only that portion of the light rays passing through the scanning lens 36 will expose the photosensitive surface of the "copier" machine forming a latent pattern comparable to the object above platen 12.

The Fresnel lens is placed approximately at the focal plane of the "office copier" reproduction system for the highest image resolution practicable. The gratings of the lens are not reproduced as lines on support surface or copy because they are removed by exposure on the photosensitive member due to the oscillating of the lens. For the same reasons, the translucent material is at the object plane and does not interfere with the reproduction of the data it images. The light rays delivered from objective lens 14 of the microfilm projection system all strike the Fresnel lens, that is, fall substantially within the area always covered by the Fresnel lens. The resulting image striking the photosensitive member of the "office copier" is of exceptionally good quality and resolution, being far superior to prior art systems for enlarging and copying microfilm image data by a Fresnel lens by raising the lens out of the focal plane to eliminate reproduction of the grating lines.

While the invention has been described with reference to the structures disclosed herein, it is not confined to the details set forth; although the examples and description emphasis is on electrostatographic machines, its use with other processes of copying is to be realized; and this application is intended to cover such modifications or changes as may come within the purposes of the improvements of the scope of the following claims.

I claim:

1. A production system for enlarging and reproducing microsize data from microfilm, such system having a photosensitive surface adapted for receiving image rays of the enlarged microsize data in a processing system for producing copies therefrom:

first projection means, an image receiving member arranged to receive enlarged microsize data projected by said first projection means, said receiving member including a Fresnel lens positioned substantially in the focal plane of said first projection means; and second projection means adapted to scan across said receiving member and direct the light rays thereon to the photosensitive surface, and means to impart oscillatory movement to the Fresnel lens in a direction skewed to the direction of the scan of the second projection means.

2. The apparatus of claim 1, wherein said receiving member includes further imaging means associated therewith positioned substantially within the focal plane of said first projection system, said imaging means including a light dispersing material.

3. The apparatus of claim 1, where said Fresnel lens and said light dispersing material both oscillate at a rate sufficient to effect relatively uniform exposure of the photosensitive surface.

4. The apparatus of claim 1, wherein said oscillation is linear and in a direction substantially parallel to the focal plane of said second projection system.

5. The apparatus of claim 1, said Fresnel lens having at least 100 gratings per inch, wherein said oscillating rate is at a frequency of at least 7 cycles per second at an amplitude of one-half inch.

6. The apparatus of claim 1, said Fresnel lens having at least 100 gratings per inch, wherein said oscillating rate is at least a frequency of 23.3 cycles per second at an amplitude of one-eighth inch.

7. The apparatus of claim 1, wherein said first projection means, said microsize image receiving means, and said means to impart oscillatory motion include means to mount them to be movable as a unit at the object plane of said second projection means.

8. The apparatus of claim 7 further including a removably positionable light tight container for housing said first projection means, said microdata image receiving means, and said means to impart oscillatory motion, and preventing ambient light for affecting the image projection.

9. The apparatus of claim 1 wherein said second projection means is adapted to scan across said receiving member and said oscillation is in a direction transverse to the direction of the scan.